A. MORRISON.
Apparatus for Separating Nails.
No. 143,246. Patented September 30, 1873.
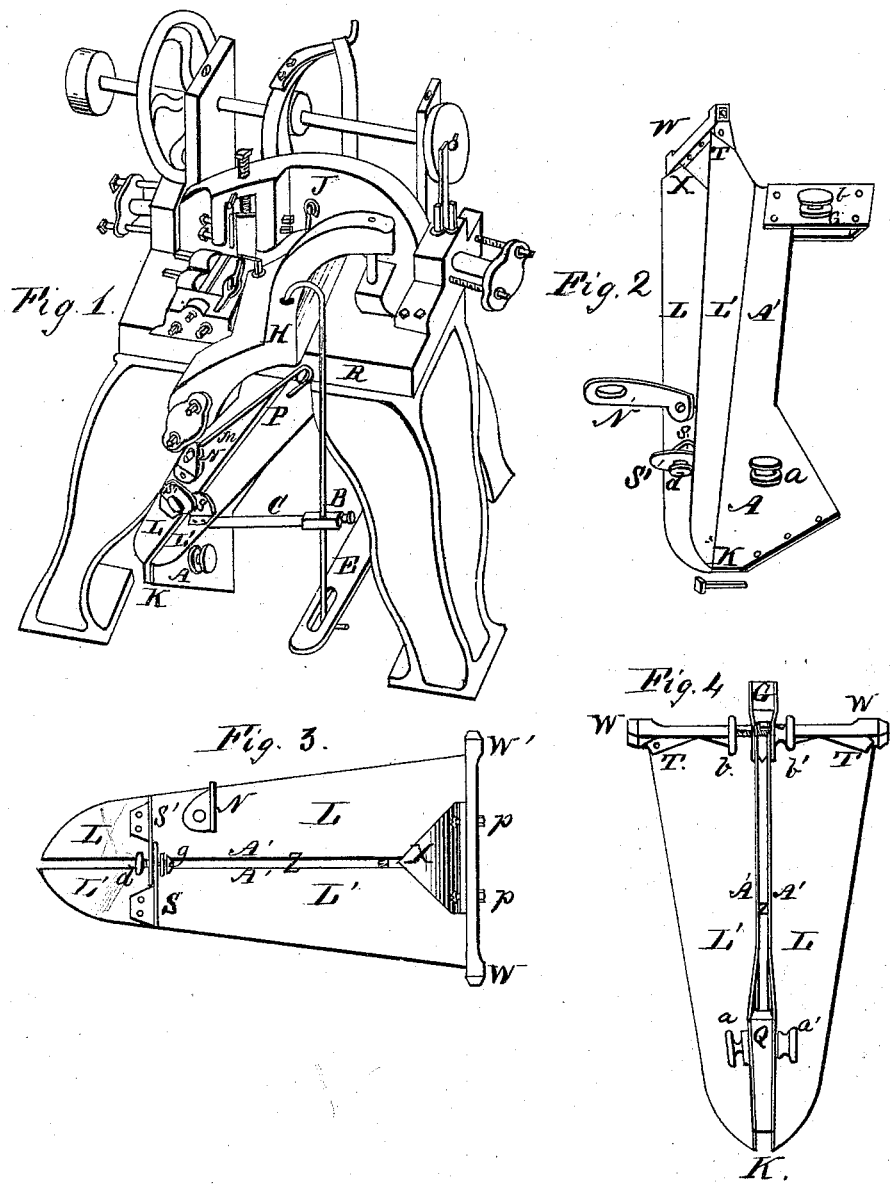
Witnesses.
Theophilus Weaver
Daniel A. Kepner
Inventor.
Alexander Morrison

UNITED STATES PATENT OFFICE.

ALEXANDER MORRISON, OF HARRISBURG, PENNSYLVANIA.

IMPROVEMENT IN APPARATUS FOR SEPARATING NAILS.

Specification forming part of Letters Patent No. 143,246, dated September 30, 1873; application filed April 2, 1873.

*To all whom it may concern:*

Be it known that I, ALEXANDER MORRISON, of the city of Harrisburg, county of Dauphin and State of Pennsylvania, have made certain new and useful Improvements in Nail Separators and Cleaners, of which the following is a specification:

The nature of my invention relates to an apparatus attached to a nail-machine, whereby the perfect and the imperfect nails, as they are formed by the machine, may be separated and conveyed from the machine in different directions, and whereby dust particles, scales, and slivers occurring in cutting may also be cleaned or removed from the nails. The invention consists, first, in providing the apparatus with an upward forward-conveying chute, arranged connectedly with an under rearward-conveying chute, the parts forming the chutes being adjustably connected, adapting the device to nails of various sizes. Second, in arranging the approach of the two vertically-imposed converging chutes, so that the crevice-trap in the trough of the upper chute may be utilized through its whole extent to drop the imperfectly-formed nails through it onto the slant floor of the under chute, and to pass all perfectly-formed nails unobstructedly forward, to be dropped beyond the end of slant floor of the under chute, the exit end of the crevice-trap being sufficiently deep to allow the points of the nails free passage over the end of said floor. Third, in providing the upper faces of the lapels composing the upper chutes with certain swiveled curb-standards, which are peculiarly formed and adapted to regulate the travel of the nails down the incline of the upper chute, and they are provided with ears by which the chute-sections are adjustably connected together. Fourth, in the combination and arrangement of certain parts by which the apparatus is attached to and operated by the nail-machine, which gives it rocking motion.

In the accompanying drawings, Figure 1 is a perspective view of a nail-machine with my improved apparatus attached. Fig. 2 is a side view of my apparatus detached. Fig. 3 is a top view of the same. Fig. 4 is a view of the apparatus inverted.

Similar letters refer to similar parts in the general description.

My improved apparatus consists mainly of the two similarly-formed angular sections L A' and L' A' in form, as shown, applied longitudinally to each other, made tapering toward their front ends, and truncate at their rear ends, flared outwardly at their tops, forming the trough of the upper chute, aligned parallel and near each other below, forming a wedge-form box below, the slant rearward-inclined bottom of which is the under chute, so named because located vertically under the upper chute, which inclines downwardly forward, substantially as shown in Figs. 1, 2, and 3. The taps L L' are termed lapels, the lower parts A' A' fenders. The rear ends of the lapels L L' are pivoted exteriorly through ears to the cross-head W, as shown at T T. A shield, X, in form as shown, is also attached to the cross-head W, as shown, to keep the nails from lodging in the comparatively inert end of the upper chute, as will be more fully set forth. The angular trough of the upper chute has a longitudinal crevice-trap, Z, therein, so named because it entraps defective nails, as will be hereinafter set forth. Said crevice-trap is made of various gage by properly distancing the main sections L A' and L' A', from each other, as follows: Two standards, S S', formed transversely to and upright on the upper lapels L L' connect said sections by a screw, $d\ g$, which passes through one of the standards S or S' in a slot therein, and travels in the other to clamp the two together. Said sections being pivoted to cross-head W, as stated, it is evident the upper parts of the sections can be set at will if released below. The fenders A' A' are provided with differential screws and nuts $a\ a'\ b\ b'$, in position, as shown, by which said parts are compressed or released. The points of the screws are of less caliber and finer thread to engage the nuts than the shanks are which engage the fender-plate, so that driving the screws distends the fender-plates, and withdrawing the screws compresses the same. While the fender-plates are free from compression the screw $d\ g$ is set as desired above, and the sections are then rigidly compressed by the said screws below. The fenders A' A' are permanently distanced from each other, at their lower margins, by the floor of the under chute, which is a rectangular strap of sheet metal, riveted to the fenders lip-form; but may be formed as part of the fenders, by providing each of said plates with a half-way foot—foot stepping on foot, rabbet-joint form—to form said floor. The upper end of said floor is the head of the under chute, which begins vertically under the upper chute, and is distanced sufficiently from it to allow ample vertical crevice-space K between the chutes to pass well-formed nails, suspended by their heads in the crevice-trap Z, freely over the head of the under chute.

The whole extent of the upper chute is thus utilized to test the make of the nail, which, if headless, or defective about the head, will be dropped into the under chute, and, conveyed thereby in an opposite direction, will be separated from well-formed nails, which make their exit directly from the upper chute through the open space K.

A perfect head is made the criterion of a perfect body of a nail for the obvious reason that the griper of the nail-machine cannot hold the defective body firmly enough to enable the header of the machine to form the nail-head perfectly.

The fenders A' A' are located a little out laterally from the crevice Z in the upper chute; and the lapels L L' are made thus to project— eaves-form—inwardly over the fender-walls, so that the crevice is a little narrower than the space immediately below it. This space, in connection with the crevice proper, is termed the trap. It is so made to allow the nails suspended by their heads therein to dangle at their points below, to a limited extent, to more thoroughly test the make of their heads, as well as to avoid clogging in passing over the upper chute. Immoderate lateral dangling tends to let even well-formed nails through the crevice unless the gage thereof is very accurately determined, which is not desirable in practice. The fenders A' A' are, therefore, employed to limit the lateral dangling, and thus less exactness is required in the breadth of the said crevice; so that a nail may be freely carried therein, either edgewise or sidewise, to the place of exit.

The rocking motion, which will be hereinafter explained, requires that the upper chute be provided with a curbing device to prevent nails traveling on top of others, in which case the riders would evade the test of the crevice-trap. The standards S S' are, therefore, employed, not only to connect the sections, as stated, but also to regulate the travel of the nails over the upper chute. Said standards are incised transversely on their sides adjacent to the crevice Z, thus forming, when united, a wicket or opening over the crevice, through which only one nail can pass at the same time. Therefore the nail riding on another is detained by the wicket until it becomes properly inserted in the crevice-trap. The wicket is located, as shown, about one-third the chute-length in from its discharge end.

The vertical strap N is located near the middle of, and on the upper side of, the lapel L; is provided with an enlarged eyelet in its upper end, to admit into it very loosely an arm of a hanger, M, whose upper end is adjustably attached to the front side of the nail-machine bench R, in position as shown in Fig. 1.

The strap N is the sole support of my improved apparatus at its front end. The rear end thereof is supported as follows: The cross-head W is somewhat extended laterally from the upper chute both ways, and is pivoted, at its ends, to the nail-machine bench on its under side by means of set-screws through ears projecting from the under side of the bench, the set-screws serving as centers in the ends of the said cross-head.

The agitator C is an adjustable arm, provided with an eye and set-screw at its one end, by which it is attached to the vertical traction-spring rod B, which retracts the header H. The other end of said arm C is extended in a horizontal direction from said vertical rod B, to simply come in contact with the separator device at a point immediately below the lapel, against which it acts concussively, and with a vertically-reciprocatory motion, this motion being derived from the rod B. The arm C raises the front end of the apparatus to a limited extent, and lets it down, by gravity, somewhat irregularly, causing the apparatus not only to rock about the cross-head W as an axis, but is, also, somewhat laterally thrust, by the lift of the arm C, against the beveled under side of the lapel. This rocking motion hustles the nails forward over the upper chute, the rear end thereof having the oblique shield X therein, to facilitate the start of the nails, they being let fall from the machine-dies on this part of the chute.

The inclined way of the upper chute, as well the attachments with the nail-machine, are all shown substantially in Fig. 1.

Having thus fully specified my invention, what I claim as new and useful, what I desire to secure by Letters Patent, is—

1. The frames L A' and L' A', in combination with each other, when joined adjustably above by the binding-screw $d\ g$ in the heads of the standards S S', or their equivalents, and when joined adjustably below by the differential screws $a\ b$ and $a'\ b'$, or their equivalents, so as to form between them, by their direct union, the defective-nail exit-opening Z, of variable width, in the manner as and for the purpose herein set forth.

2. The conformation of the inner faces of the fenders A' A' farther apart at the bottom than at the top, to allow the nails limited space to dangle while suspended by their heads in the crevice Z, substantially as herein set forth.

3. In the trough of the upper chute, the incised standards S S', pivoted to each other adjustably by a slot in the head of one of the standards, and a seat in the opposite head for the binding-screw $d\ g$, in combination with the frames L A' and L' A', to form in said trough, by their union, a variable wicket vertically over the opening Z, substantially as and for the purpose herein set forth.

4. The apparatus herein set forth, composing the upper and the under chutes, in combination with the nail-machine, by means of the strap N and pivoted cross-head W attached to the frame of the nail-machine, and the agitator C attached to the spring-rod B on the nail-machine heading-lever, all operating conjointly, substantially in the manner as and for the purpose herein set forth.

5. The agitator C, attached to the vibrating rod B, in combination with the nail-separating apparatus, when its connection therewith is by simple contact against the under side of the oblique outwardly-projecting plate forming a side of the upper chute, the vertical vibration of the agitator being thus parried by the elasticity of the frames of the apparatus in favor of lateral and vertical agitation, as herein set forth.

6. In a nail-separating apparatus, a forwardly-inclined upper chute, for the delivery of the perfect nails, in combination with a rearwardly-inclined under chute for the removal of the imperfect nails, slivers, and dust particles, to favor the collection of the discharged contents of the chutes in separate receivers, as herein set forth.

ALEXANDER MORRISON.

Witnesses:
  THEOPHILUS WEAVER,
  D. A. KEPNER.